(12) United States Patent
Hedblom et al.

(10) Patent No.: US 10,989,337 B2
(45) Date of Patent: Apr. 27, 2021

(54) TUBE STRUCTURE WITH A PROTECTED SENSOR AND METHOD FOR MANUFACTURING A TUBE STRUCTURE WITH A PROTECTED SENSOR

(71) Applicant: SANDVIK INTELLECTUAL PROPERTY AB, Sandviken (SE)

(72) Inventors: Erika Hedblom, Valbo (SE); Daniel Edmarker, Gävle (SE)

(73) Assignee: Sandvik Intellectual Property AB, Sandviken (SE)

(*) Notice: Subject to any disclaimer, the term of this patent is extended or adjusted under 35 U.S.C. 154(b) by 90 days.

(21) Appl. No.: 16/489,078

(22) PCT Filed: Feb. 23, 2018

(86) PCT No.: PCT/EP2018/054566
§ 371 (c)(1),
(2) Date: Aug. 27, 2019

(87) PCT Pub. No.: WO2018/158162
PCT Pub. Date: Sep. 7, 2018

(65) Prior Publication Data
US 2020/0011454 A1    Jan. 9, 2020

(30) Foreign Application Priority Data

Feb. 28, 2017 (EP) .................................. 17158579

(51) Int. Cl.
*F16L 9/18* (2006.01)
*F16L 9/02* (2006.01)
(Continued)

(52) U.S. Cl.
CPC .................... *F16L 9/02* (2013.01); *F16L 9/14* (2013.01); *F16L 9/18* (2013.01); *F16L 39/005* (2013.01); *F16L 58/08* (2013.01); *F16L 2201/30* (2013.01)

(58) Field of Classification Search
CPC ....... F16L 9/14; F16L 9/18; F16L 9/19; F16L 9/20; G01M 3/04; G01M 3/18
(Continued)

(56) References Cited

U.S. PATENT DOCUMENTS

| 360,782 | A | * | 4/1887 | Ober | F16L 59/026 138/113 |
| 2,440,245 | A | * | 4/1948 | Chevigny | H01J 19/36 165/80.4 |

(Continued)

FOREIGN PATENT DOCUMENTS

| JP | H04-160335 A | 6/1992 |
| WO | 2013/135244 A1 | 9/2013 |
| WO | 2014/169366 A2 | 10/2014 |

OTHER PUBLICATIONS

International Search Report and Written Opinion dated May 7, 2018, issued in corresponding International Patent Application No. PCT/EP2018/054566.

*Primary Examiner* — Patrick F Brinson
(74) *Attorney, Agent, or Firm* — Morgan, Lewis & Bockius LLP

(57) ABSTRACT

A tube structure (1) comprising an inner tube (3) of metal and an outer tube (2) of metal, wherein the inner tube (3) extends in the outer tube (2), wherein a spacer tube (4) is located between the inner tube (3) and the outer tube (2), wherein the spacer tube (4) comprises at least one slit (5), wherein the at least one slit (5) extends in a longitudinal direction of the spacer tube (4) and over an entire longitudinal extension of the spacer tube (4), and wherein the at (Continued)

least one slit (5) forms a space in a radial direction of the tube structure (1) extending from an outer surface (7) of the inner tube (3) to an inner surface (8) of the outer tube (2), wherein the tube structure (1) further comprises at least one signal line (9) located in the at least one slit (5) of the spacer tube (4), wherein the at least one signal line (9) extends in the longitudinal direction of the spacer tube (4).

16 Claims, 2 Drawing Sheets

(51) Int. Cl.
*F16L 9/14* (2006.01)
*F16L 39/00* (2006.01)
*F16L 58/08* (2006.01)

(58) Field of Classification Search
USPC .................................. 138/112–114, 149, 104
See application file for complete search history.

(56) References Cited

U.S. PATENT DOCUMENTS

| | | | |
|---|---|---|---|
| 3,489,438 A * | 1/1970 | McClure | E21B 17/18 285/123.15 |
| 5,497,809 A | 3/1996 | Wolf | |
| 6,116,290 A * | 9/2000 | Ohrn | F16L 59/143 138/149 |
| 7,025,580 B2 * | 4/2006 | Heagy | B29C 63/34 138/108 |
| 7,156,126 B2 * | 1/2007 | Topek | F16L 7/00 138/108 |
| 8,256,469 B2 | 9/2012 | Felix-Henry | |
| 2003/0175084 A1 * | 9/2003 | Finzel | H02G 1/08 405/184.4 |
| 2012/0175005 A1 | 7/2012 | Andersen | |
| 2018/0087694 A1 * | 3/2018 | Cherkaoui | F17D 1/18 |

* cited by examiner

TUBE STRUCTURE WITH A PROTECTED SENSOR AND METHOD FOR MANUFACTURING A TUBE STRUCTURE WITH A PROTECTED SENSOR

TECHNICAL FIELD AND BACKGROUND

The present disclosure relates to a tube structure comprising an inner tube of metal and an outer tube of metal, wherein the inner tube extends in the outer tube. The present disclosure furthermore relates to a method for manufacturing a tube structure comprising the steps of providing an inner tube of metal and an outer tube of metal.

Tubes of metal, in particular of stainless steel, are used in a plurality of applications, in which the tubes are subject to multiple stresses. These stresses may for example lead to pipe bursts, which not only require a replacement of the respective tube, but also increase costs. In some cases, sensors are therefore attached to these tubes, which will indicate and also send a signal when a damage appears in the tube. However, it has proven to be very difficult to protect the attached sensors against environmental influences.

It is an aspect of the present disclosure to provide a solution to this problem by providing a tube structure of metal as well as a method for manufacturing such a tube structure, wherein at least one signal line can be protectively located within the tube.

SUMMARY

The present disclosure therefore relates to a tube structure comprising an inner tube of metal and an outer tube of metal, wherein the inner tube extends in the outer tube, wherein in a spacer tube is located between the inner tube and the outer tube, wherein the spacer tube comprises at least one slit, wherein the at least one slit extends in a longitudinal direction of the spacer tube and an entire longitudinal extension of the spacer tube and wherein the at least one slit forms a space in a radial direction of the tube structure extending from an outer surface of the inner tube (3) to an inner surface of the outer tube characterized in that the tube structure comprises at least one signal line located in the at least one slit of the spacer tube, wherein the at least one signal line (9) extends in the longitudinal direction of the spacer tube the at least one signal line extends in the longitudinal direction of the spacer tube.

In this design, the spacer tube not only provides a defined minimum spacing between the inner tube and the outer tube in a radial direction, but also provides a cross-section allowing to accommodate a signal line extending in the longitudinal direction of the tube structure. In order to provide a stable tube structure, the slit connects the outer surface of the inner tube and the inner surface of the outer tube, i.e. the spacer tube is discontinuous in a circumferential direction thereof and the slit extends over the entire longitudinal extension of the spacer tube.

By providing this slit, it is possible that in an embodiment of the present disclosure the inner tube, the spacer tube and the outer tube are mechanically force-fitted over a part of the longitudinal extension of the spacer tube. By providing the slit in the spacer tube, any attempt to reduce the diameter of the outer tube not only leads to a tight force fitting between the outer tube and the spacer tube, but directly leads to a reduction of the inner diameter of the spacer tube and thus a force-fitting between the spacer tube and the inner tube. It is evident that when reducing the inner diameter of the outer tube, such that there is a tight force fit between the outer tube and the spacer tube, the circumferential extension of the spacer tube (i.e. in a direction perpendicular to the longitudinal direction of the spacer tube) is reduced, too. According to one embodiment, the spacer tube and the outer tube are mechanically force-fitted over a part of the longitudinal extension of the inner tube. According to one embodiment, the spacer tube and the outer tube are mechanically force-fitted over the entire longitudinal extension of the inner tube. Further, the term "force-fitted" means that the tubes are mechanically connected by a force which will ensure that the connection between the tubes will be so strong that it will withstand any outer and inner differences in operation conditions, for example temperature and/or pressure differences, which the tubes will be exposed to. Other terms to describe this are "tight-fitted" or "tight-fitting".

In an embodiment of the present disclosure the inner tube, the spacer tube and the outer tube extend concentrically with respect to each other.

In principle, the spacer tube could be made of any material providing the required stability, thus the material may be selected from both plastic and metallic material.

In an embodiment of the present disclosure, the spacer tube comprises exactly one slit. However, embodiments are feasible, wherein the spacer tube comprises a plurality of slits, in particular three to five slits. It shall be understood that in an embodiment, wherein the spacer tube comprises a plurality of slits, the spacer tube is actually a multiple part structure, wherein the different segments of the spacer tube have to be distributed manually in a circumferential direction on the inner tube.

In an embodiment of the disclosure, the inner tube and/or the spacer tube and/or the outer tube are manufactured of a metal chosen from a group consisting of steel, carbon-steel, stainless steel, manganese steel, a nickel-based alloy, aluminium (Al), an Al-based alloy, copper (Cu), a Cu-based alloy, zirconium (Zr), a Zr-based alloy, titanium (Ti), a Ti-based alloy, an iron-chromium-aluminium (FeCrAl) alloy, ferritic steel or any combination thereof.

It shall be understood that the hollows, which are used to provide or manufacture the inner tube and/or the spacer tube and/or the outer tube, in an embodiment are made of a metal chosen from a group consisting of steel, carbon-steel, stainless steel, manganese steel, a nickel-based alloy, aluminium (Al), an Al-based alloy, copper (Cu), a Cu-based alloy, zirconium (Zr), a Zr-based alloy, titanium (Ti), a Ti-based alloy, an iron-chromium-aluminium (FeCrAl) alloy, ferritic steel or any combination thereof.

Furthermore, it shall be understood that generally the material of the inner tube and/or the spacer tube and/or the outer tube may be chosen independently from each other. In an embodiment of the present disclosure, the inner tube and the outer tube, and optionally the spacer tube, consist of an identical material. In an alternative embodiment, the outer tube and the inner tube comprise materials being different from each other. The latter is advantageous as by this way different properties of the materials for the outer tube and for the inner tube may be provided, which can be combined arbitrarily in order to obtain a tube adopted for a particular application. In another embodiment, the inner tube and the outer tube are made of a first material and the spacer tube is made of a second material, wherein the first material and the second material are different from each other.

In an embodiment of the present disclosure, the inner tube and/or the spacer tube and/or the outer tube is a seamless tube or a welded tube.

Furthermore, to solve the above aspect according to the present disclosure, a system is suggested comprising the tube structure as it has been described above according to embodiments thereof.

A signal line in the sense of the present disclosure is understood as any line being able to transmit a signal, i.e. information, from a transmitter to a receiver. Though, in an embodiment of the present disclosure, the signal line is chosen from a group consisting of a line for an electrical signal, a line for an electromagnetic signal, a line for an optical signal and a combination thereof. An example for a signal line is an isolated electrically conductive wire or an optical glass fibre.

In an embodiment of the disclosure, at least one sensor is located between an outer surface of the inner tube and an inner surface of the outer tube. In an embodiment, this at least one sensor is connected to at least one signal line running in the slit.

In an embodiment, at least one sensor may be located in the slit of the spacer tube. However, in another embodiment at least one recess is provided in the spacer tube, wherein the at least one recess connects to the at least one slit and wherein the at least one sensor connected to a signal line is located at least partly in the at least one recess. A recess connecting to the slit in the sense of the present disclosure means that the slit and the recess in the spacer tube provide a continuous space or volume to accommodate the at least one sensor and the at least one signal line. In an embodiment, a recess may be formed by widening the slit at a certain position in a longitudinal direction of the tube structure.

In an embodiment of the present disclosure, the sensor is chosen from a group consisting of an acceleration sensor, a vibration sensor, a conductivity sensor, a pressure sensor, a temperature sensor, a strain gorge, a corrosion sensor, a magnetic field sensor, a heat flux sensor, a torque sensor and a combination thereof.

In an embodiment of the disclosure, the signal line and/or the sensor are glued into the slit and/or the recess by the aid of an adhesive. Such a gluing fixes the sensor and/or the signal line in the slit or in the recess during manufacturing of the tube structure. According to another embodiment the signal line and/or the sensor are welded into the slit and/or the recess.

The above aspect is also solved by a method for manufacturing a tube structure comprising the steps: providing an inner tube of metal, providing an outer tube of metal, characterized in that the method further comprises the steps of providing a spacer tube with at least one slit extending in a longitudinal direction of the spacer tube, mounting the spacer tube on an outer surface of the inner tube, inserting a signal line into the slit of the spacer tube, and inserting the inner tube and the spacer tube into the outer tube such that the inner tube and the spacer tube extend in the outer tube, wherein the slit forms a space in a radial direction of the tube structure extending between the outer surface of the inner tube and an inner surface of the outer tube.

In an embodiment of the present disclosure, providing the spacer tube includes machining of the spacer tube, in particular machining of the spacer tube by chip-removing machining, to form the at least one slit. For example, in an embodiment of the present disclosure, the spacer tube may be provided by hot-extruding a hollow from a mould, cold-forming the hollow into the spacer tube, in particular either by cold pilger milling or cold drawing, and then machining of the slit into the spacer tube.

The machining of the spacer tube to form the at least one slit could for example be effected by milling, cutting or laser machining.

In an embodiment of the present disclosure, mounting of the spacer tube on the outer surface of the inner tube includes inserting the inner tube into the spacer tube.

In a further embodiment, mounting of the spacer tube on the outer surface of the inner tube includes welding or gluing of at least two separate segments of the spacer tube onto the outer surface of the inner tube. It is apparent that a welding or gluing of separate segments of the spacer tube will be required once the spacer tube provides a plurality of slits extending over the entire longitudinal direction of the spacer tube.

In an embodiment of the present disclosure, the spacer tube prior to the mounting onto the inner tube has an inner diameter being smaller than the outer diameter of the inner tube. Due to the slit formed in the spacer tube, still the inner tube can be inserted into the spacer tube bending the spacer tube slightly open. By this way a tight force fit between the spacer tube and the inner tube is provided, thus no further steps required to provide this tight force fit.

In an embodiment of the present disclosure, the method for manufacturing the tube structure according to the present disclosure further comprises the step of mechanically force-fitting the spacer tube and the outer tube over a part of the length of the inner tube. According to another embodiment, this step of mechanically force-fitting is over the entire length of the inner tube.

There are in principal two ways how a force-fitting of all three tubes forming the tube structure can be achieved. Either the inner tube is expanded such that the spacer tube experiences a tight force fitting with the outer tube or the inner diameter of the outer tube is reduced such that the outer tube experiences a tight force fitting with the spacer tube and thus with the inner tube.

In an embodiment of the present disclosure, the inner tube, the spacer tube and the outer tube are drawn together through a drawing die with an inner tool surface forming an outer surface of the tube. In an embodiment of such a method, a tool diameter of the inner tool surface of the drawing dye is chosen such that by the drawing an inner diameter of the outer tube is reduced such that after drawing, the outer tube and the spacer tube are force-fitted on the inner tube.

In one embodiment of the method as defined hereinabove or hereinafter, not only the signal line is inserted into the slit, but a sensor is also inserted in the space defined between the outer tube and the inner tube. The latter may either be achieved by locating the sensor in the slit or by providing a recess connecting to the slit and locating the sensor at least partly in the recess. In an embodiment, the recess may be formed by widening the slit at a certain position in a longitudinal direction of the tube structure. It is apparent that in an embodiment, wherein a sensor is provided, this sensor may be connected to the signal line.

In an embodiment, the at least one signal line and the at least one sensor are placed in the slit after inserting the inner tube into the spacer tube and before inserting the inner tube and the space tube together in the outer tube.

BRIEF DECSRIPTION OF THE FIGURES

The foregoing as well as the following detailed description of the embodiments will be better understood when read in conjunction with the appended drawings. It should be understood that the embodiments depicted are not limited to the precise arrangements and instrumentalities shown.

DETAILED DESCRIPTION

Figure 1:
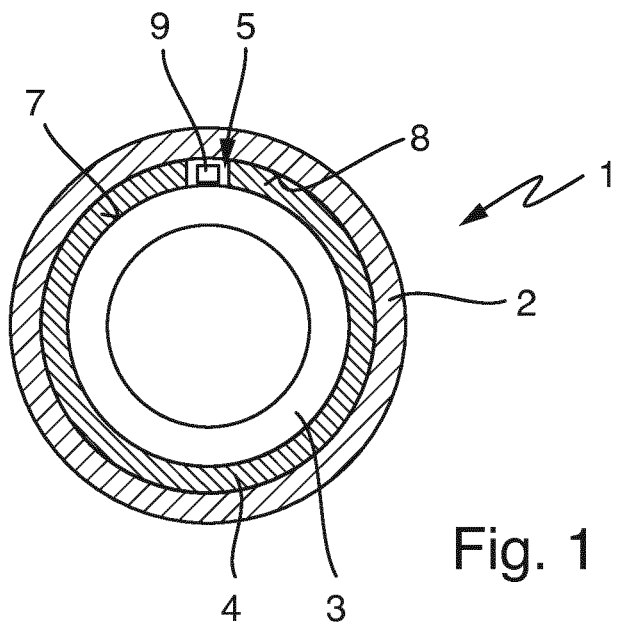
FIG. 1 is a schematic cross-sectional view of a first embodiment of a system with tube structure and signal line according to the present disclosure.
Figure 2:
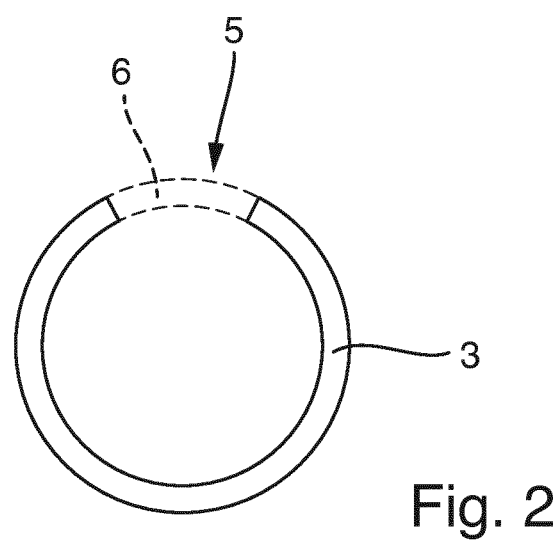
FIG. 2 is a schematic cross-sectional view of the spacer tube of the tube structure of FIG. 1.
Figure 3:
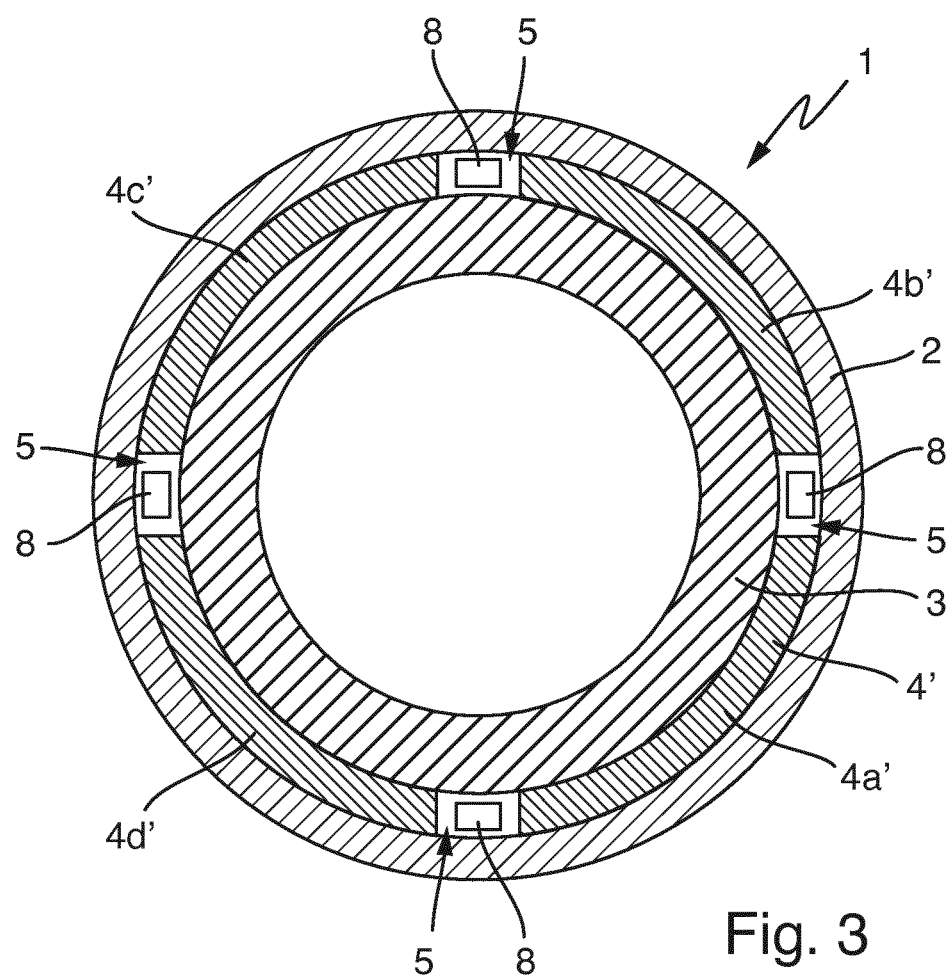
FIG. 3 is a schematic cross-sectional view of an alternative embodiment of a system with tube structure and a signal line according to the present disclosure.

In the figures, identical elements have been denoted by identical reference numbers. All FIGS. 1 to 3 show schematic cross-sectional views of a system with a tube structure according to an embodiment of the present disclosure or parts thereof. The cross-sectional views are drawn in a plane perpendicular to the longitudinal extension of the respective tube structures or parts thereof.

A system according to the present disclosure always comprises tube structure 1, 1' having an outer tube 2 and an inner tube 3. The system further comprises a signal line 9. A constant distance between the outer tube 2 and the inner tube 3 is guaranteed by a spacer tube 4, 4'.

In all embodiments depicted, the inner tube 3 is a cold-drawn stainless steel tube as is the outer tube 2. In the embodiment of FIGS. 1 and 2, the spacer tube 4 is also provided by a seamless cold-drawn stainless steel tube. After cold-drawing a slit 5 has been introduced into the tube.

Instead of cutting the cold-drawn spacer tube with a single cut, the spacer tube is cut twice such that a segment 6 drawn in dotted lines in FIG. 2 is removed from the tube. Removing the material section 6 from the spacer tube 4 guarantees that the slit 5 forms a space extending in a radial direction from the outer surface 7 of the inner tube 3 to the inner surface 8 of the outer tube 2. The slit 5 thus provides a space being large enough to place a signal line 9 in the slit 5. The inner diameters and outer diameters of the inner tube 3, the spacer tube 4 and the outer tube 2 match each other such that a loose fitting is provided, wherein the inner tube 3 can be pushed or moved into the spacer tube 4 manually as well as the spacer tube 4 together with the inner tube 3 can be pushed manually into the outer tube 2.

For the embodiment of the tube structure 1 depicted in FIG. 1, in a first step the inner tube is inserted into the spacer tube 4. In a second step the signal line 9 is placed in the slit 5 and then in a third step the inner tube 3 and the spacer tube 4 including the signal line 9 are inserted into the outer tube 2.

Furthermore, at the end of the manufacturing steps, the tube structure 1 must be such that the outer tube 2, the spacer tube 4 and the inner tube 3 are force-fitted with respect to each other. Guaranteed tight force fit is achieved by cold-drawing the tube structure formed of the inner tube 3, the spacer tube 4 and the outer tube 2 arranged concentrically with respect to each other, but loose fitted, together through a drawing die. An inner tool diameter of this drawing die is smaller than the outer diameter of the outer tube 2 before the drawing step. By reducing the outer diameter of the outer tube 2 when cold-drawing the tube structure 1, the outer tube 2 is drawn onto a core formed by the inner tube 3 and the spacer tube 4. The slit 5 has a size which is large enough such that the slit even after cold-drawing of the structure 1 forms a space extending in a radial direction of the tube structure from the outer surface of the inner tube to the inner surface of the outer tube. Consequently, even after cold drawing, the slit is broad enough to accommodate the signal line 9.

FIG. 3 shows an alternative embodiment of a system with tube structure 1', wherein the spacer tube 4' comprises four slits 5. Consequently, the spacer tube 4' is provided by four segments 4a'-4d'.

It should be pointed out that in this design it is advantageous if each of the segments 4a'-4d' is fixed, e.g. by point-welding, on the inner tube 3 before the inner tube 3 and the spacer tube 4' are inserted into the outer tube 2.

In both embodiments of FIGS. 1, 2 and of FIG. 3, each slit 5 in the spacer tube 4, 4' has an extension in a circumferential direction of the tube structure 1, 1' such that not only a signal line 8 may be accommodated in the slit 5, but also a sensor can be placed at distinct longitudinal positions of the tube structure 1, 1' in order to provide the required measurements indicating integrity of the inner tube 3.

Before inserting the inner tube 3 together with the spacer tube 4 into the outer tube 2, the signal line(s) as well as the sensor(s), where applicable, are inserted into the slit 5 and fixed therein to allow a reliable and quick assembly of the tube structure.

For purposes of the original disclosure, it is noted that all features become apparent for a person skilled in the art from the present description, the figures and the claims even if they have only been described with reference to particular further features and can be combined either on their own or in arbitrary combinations with other features or groups of features disclosed herein as far as such combinations are not explicitly excluded or technical facts exclude such combinations or make them useless. An extensive, explicit description of each possible combination of features has only been omitted in order to provide a short and readable description. While the disclosure has been shown in detail in the figures and the above description, this description is only an example and is not considered to restrict the scope of protection as it is defined by the claims. The disclosure is not restricted to the disclosed embodiments.

Modifications to the disclosed embodiments are apparent for a person skilled in the art from the drawings, the description and the attached claims. In the claims, the word "comprising" does not exclude other elements or steps and the undefined article "a" does not exclude a plurality. The mere fact that some features have been claimed in different claims does not exclude their combination. Reference numbers in the claims are not considered to restrict the scope of protection.

REFERENCE NUMERALS 1, 1' tube structure
2 outer tube
3 inner tube
4, 4' spacer tube
4a'-4d' segments of the spacer tube 4'
5 slit
6 segment, material section
7 outer surface of the inner tube
8 inner surface of the outer tube
9 signal line

The invention claimed is:

1. A tube structure comprising:
an inner tube of metal; and
an outer tube of metal,
wherein the inner tube extends in the outer tube,
wherein a spacer tube is located between the inner tube and the outer tube,
wherein the spacer tube comprises at least one slit,
wherein the at least one slit extends in a longitudinal direction of the spacer tube and over an entire longitudinal extension of the spacer tube,
wherein the at least one slit forms a space in a radial direction of the tube structure extending from an outer surface of the inner tube to an inner surface of the outer tube,
wherein the tube structure comprises at least one signal line located in the at least one slit of the spacer tube, and
wherein the at least one signal line extends in the longitudinal direction of the spacer tube.

2. The tube structure according to claim 1, wherein the outer tube and the spacer tube are mechanically force-fitted over part of the length of the inner tube.

3. The tube structure according to claim 1, wherein the inner tube, the spacer tube and the outer tube extend concentrically with respect to each other.

4. The tube structure according to claim 3, wherein the signal line is chosen from a group consisting of a line for an electrical signal, a line for an electromagnetic signal, a line for an optical signal and a combination thereof.

5. The tube structure according to claim 1, comprising at least one sensor located between an outer surface of the inner tube and an inner surface of the outer tube.

6. The tube structure according to claim 1, wherein at least one recess is provided in the spacer tube, wherein the at least one recess connects to the at least one slit, and wherein at least one sensor connected to a signal line is located at least partly in the at least one recess.

7. A system comprising the tube structure according to claim 1.

8. A method for manufacturing a tube structure comprising the steps of:

providing an inner tube of metal;
providing an outer tube of metal;
providing a spacer tube with at least one slit extending in a longitudinal direction of the spacer tube;
mounting the spacer tube on an outer surface of the inner tube;
inserting a signal line into the slit of the spacer tube; and
inserting the inner tube and the spacer tube into the outer tube such that the inner tube and the spacer tube extend in the outer tube,
wherein the slit forms a space in a radial direction of the tube structure extending between the outer surface of the inner tube and an inner surface of the outer tube.

9. The method according to claim 8, wherein providing the spacer tube includes machining of the spacer tube to form the at least one slit.

10. The method according to claim 8, wherein mounting of the spacer tube on the outer surface of the inner tube includes inserting the inner tube into the spacer tube.

11. The method according to claim 8, wherein mounting of the spacer tube on the outer surface of the inner tube includes welding or gluing of at least two separated segments of the spacer tube onto the outer surface of the inner tube.

12. The method according to claim 8, wherein the method further comprises the step of mechanically force fitting the spacer tube and the outer tube over a part of the length of the inner tube.

13. The method according to claim 8, wherein the inner tube, the spacer tube and the outer tube are drawn together through a drawing die with an inner tool surface forming an outer surface of the outer tube.

14. The method according to claim 13, wherein a tool diameter of an inner tool surface of the drawing die is chosen such that by the drawing an inner diameter of the outer tube is reduced such that after drawing the outer tube and the spacer tube are force-fitted onto the inner tube.

15. A method according to claim 8, wherein at least one sensor operatively connected to the signal line is inserted into the slit of the spacer tube.

16. A method for manufacturing a system comprising a tube structure, wherein the method includes the method according to claim 8.

* * * * *